(12) United States Patent
Duffield et al.

(10) Patent No.: US 10,615,397 B2
(45) Date of Patent: Apr. 7, 2020

(54) BATTERY DESIGN WITH BUSSING INTEGRAL TO BATTERY ASSEMBLY

(71) Applicant: SAFT GROUPE SA, Bagnolet (FR)

(72) Inventors: Michael C. Duffield, St. Johns, FL (US); Daniel E. Kelley, York, PA (US); Gerard Rigobert, Fargues Saint Hilaire (FR); Alexandre Beugnon, Ludon Medoc (FR)

(73) Assignee: SAFT GROUPE SA, Bagnolet (FR)

( * ) Notice: Subject to any disclaimer, the term of this patent is extended or adjusted under 35 U.S.C. 154(b) by 50 days.

(21) Appl. No.: 16/123,409

(22) Filed: Sep. 6, 2018

(65) Prior Publication Data

US 2019/0006654 A1    Jan. 3, 2019

Related U.S. Application Data

(62) Division of application No. 14/541,521, filed on Nov. 14, 2014, now Pat. No. 10,096,813.

(60) Provisional application No. 61/904,722, filed on Nov. 15, 2013.

(51) Int. Cl.
| | |
|---|---|
| H01M 2/26 | (2006.01) |
| H01M 2/02 | (2006.01) |
| H01M 2/04 | (2006.01) |
| H01M 2/24 | (2006.01) |
| H01M 10/0569 | (2010.01) |
| H01M 10/0585 | (2010.01) |
| H01M 10/0587 | (2010.01) |
| H01M 2/08 | (2006.01) |
| H01M 10/0525 | (2010.01) |

(52) U.S. Cl.
CPC ........... *H01M 2/26* (2013.01); *H01M 2/0242* (2013.01); *H01M 2/0262* (2013.01); *H01M 2/043* (2013.01); *H01M 2/08* (2013.01); *H01M 2/24* (2013.01); *H01M 10/0525* (2013.01); *H01M 10/0569* (2013.01); *H01M 10/0585* (2013.01); *H01M 10/0587* (2013.01); *H01M 2/0275* (2013.01); *H01M 2300/0028* (2013.01); *H01M 2300/0037* (2013.01); *Y10T 29/4911* (2015.01)

(58) Field of Classification Search
None
See application file for complete search history.

(56) References Cited

U.S. PATENT DOCUMENTS

| | | |
|---|---|---|
| 1,980,902 A | 11/1934 | Blake |
| 2,890,262 A | 6/1959 | Kendall |
| 4,376,156 A | 3/1983 | Wheadon |

(Continued)

FOREIGN PATENT DOCUMENTS

| | | |
|---|---|---|
| DE | 102011088637 A1 | 6/2013 |
| EP | 1211739 A2 | 6/2001 |

(Continued)

OTHER PUBLICATIONS

Communication dated Mar. 16, 2015 from the European Patent Office in counterpart application No. 14193297.0.

(Continued)

*Primary Examiner* — Sarah A. Slifka
(74) *Attorney, Agent, or Firm* — Sughrue Mion, PLLC

(57) ABSTRACT

A Lithium-Ion monoblock battery assembly including a housing having a cavity for receiving an electrode assembly. Also including a cover sealingly attached to the housing, and a bussing integrally molded with at least one of the housing and the cover.

14 Claims, 12 Drawing Sheets

(56) References Cited

U.S. PATENT DOCUMENTS

| | | |
|---|---|---|
| 6,007,937 A | 12/1999 | Ruiz Rodgriguez |
| 2005/0214638 A1 | 9/2005 | Asahina |
| 2011/0236750 A1 | 9/2011 | Kohno et al. |
| 2012/0263988 A1 | 10/2012 | Obasih |
| 2012/0328945 A1 | 12/2012 | Hirose |
| 2013/0040178 A1 | 2/2013 | Lim |
| 2013/0193977 A1 | 8/2013 | Houchin-Miller |
| 2013/0252048 A1 | 9/2013 | Teramoto |
| 2013/0309537 A1 | 11/2013 | Zhao |

FOREIGN PATENT DOCUMENTS

| | | | |
|---|---|---|---|
| EP | 2355203 | A1 | 8/2011 |
| EP | 2557609 | A1 | 2/2013 |
| EP | 2642559 | A1 | 9/2013 |

OTHER PUBLICATIONS

Communication dated Mar. 16, 2015 from the European Patent Office in counterpart application No. 14193296.2.

Communication dated Jul. 9, 2015 from the European Patent Office in counterpart application No. 14193296.2.

BATTERY DESIGN WITH BUSSING INTEGRAL TO BATTERY ASSEMBLY

CROSS-REFERENCE TO RELATED APPLICATION

This application is a divisional of U.S. patent application Ser. No. 14/541,521, filed Nov. 14, 2014, which claims priority to U.S. Provisional Application No. 61/904,722, filed Nov. 15, 2013 titled MONOBLOCK. The entire disclosures of the prior applications are considered part of the disclosure of the accompanying divisional application, and are hereby incorporated by reference.

BACKGROUND OF THE INVENTION

Field of the Invention

This present disclosure relates generally to a Lithium-Ion battery assembly, including without limitation, a monoblock battery assembly having a casing with a bussing integrally molded therein.

Background

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Some conventional battery assemblies, including Lithium-Ion battery assemblies, include a plurality of electrochemical cells or battery cells mechanically connected together (e.g. bolted together) in a housing. Each battery cell in the housing has an individual metallic casing, and a connector such as a bus bar or similar element electrically couples one battery cell to one more other battery cells in the housing. The bus bar connects to an electric terminal on an outer surface of the battery cell via welding or another mechanical attachment (e.g. a bolt or a screw). The metallic casing in these conventional battery assemblies hermetically seals each battery cell to prevent moisture from entering into the cell and to prevent electrolyte from escaping the cell by a leak or evaporation, for example. Lithium-Ion batteries, in particular, as compared to some other conventional battery assemblies, are sensitive to moisture introduction in the battery cell. These conventional battery assemblies are costly as each battery cell has an individual metallic casing. Further, connection between the battery cells may be bulky and prone to breakage or leakage between the connections.

SUMMARY OF THE INVENTION

The present invention provides a monoblock battery assembly having a bussing formed integral with the battery casing and/or cover to provide a seal-tight casing which houses one or more electrode assemblies.

Through the multiple embodiments, the monoblock battery assembly of this invention reduces the costs of materials and cost of assembly, and improves stability, water tightness, and electrolyte tightness. Example embodiments of this application may address one or more of the above identified issues. However, an embodiment of this application need not solve, address, or otherwise improve on existing technologies.

BRIEF DESCRIPTION OF THE DRAWINGS

In the following detailed description, reference will be made to the accompanying drawing(s), in which similar elements are designated with similar numerals. The aforementioned accompanying drawings show by way of illustration and not by way of limitation, specific example embodiments and implementations consistent with principles of an example embodiment. These implementations are described in sufficient detail to enable those skilled in the art to practice an example embodiment and it is to be understood that other implementations may be utilized and that structural changes and/or substitutions of various elements may be made without departing from the scope and spirit of an example embodiment. The following detailed description is, therefore, not to be construed in a limited sense.

DETAILED DESCRIPTION OF THE INVENTION

Embodiments will be described below in more detail with reference to the accompanying drawings. The following detailed descriptions are provided to assist the reader in gaining a comprehensive understanding of the methods, appearances, and/or systems described herein and equivalent modifications thereof. Accordingly, various changes, modification, and equivalents of the methods, apparatuses, and/or systems described herein will be apparent to those of ordinary skill in the art. Moreover, descriptions of well-known functions and constructions may be omitted for increased clarity and conciseness.

The terms used in the description are intended to describe embodiments only, and shall by no means be restrictive. Unless clearly used otherwise, expressions in a singular form include a meaning of a plural form. In the present description, an expression such as "comprising" or "including" is intended to designate a characteristic, a number, a step, an operation, an element, a part or combinations thereof, and shall not be construed to preclude any presence or possibility of one or more other characteristics, numbers, steps, operations, elements, parts or combinations thereof.

Figure 1:
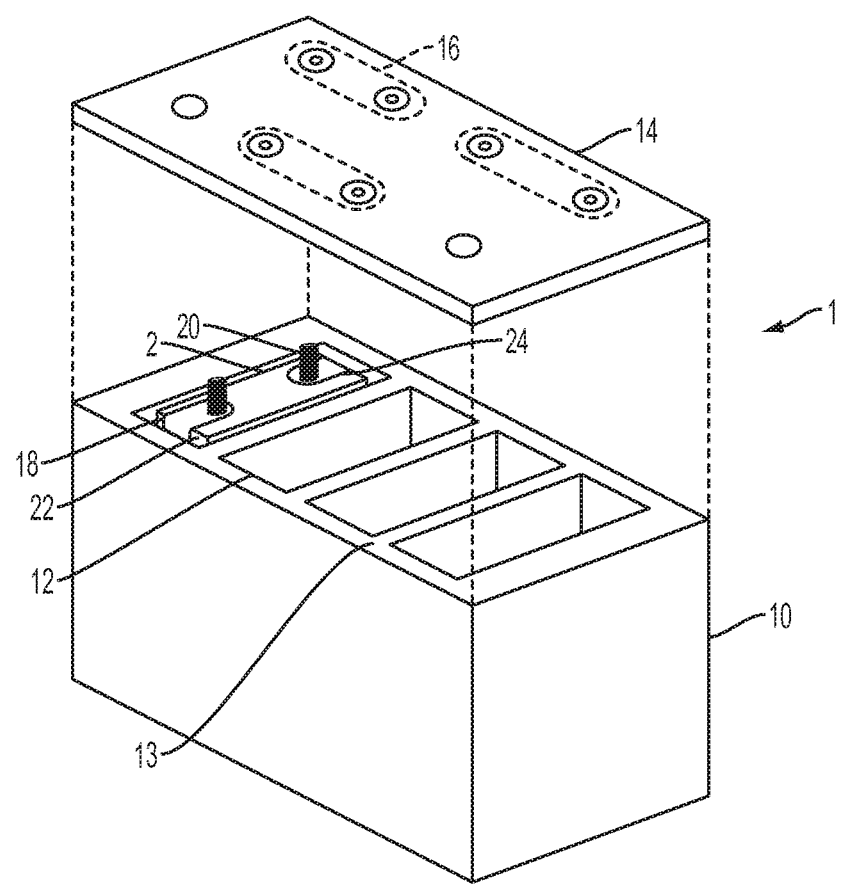
FIG. 1 shows an exploded perspective view of a monoblock battery assembly according to an exemplary embodiment.

FIG. 1 shows a perspective view of an exemplary Lithium-Ion monoblock battery assembly 1. The monoblock battery assembly 1 generally includes a battery housing with multiple, separate individually sealed, but electrically connected cell compartments or cavities which are each designed to house an electrode assembly, electrolyte, and possibly interconnecting members or bussings. The cells or cell compartments in the monoblock battery assembly 1 may be connected in series or in parallel configuration.

According to a non-limiting embodiment as shown in FIG. 1, a Lithium-Ion monoblock battery assembly 1 includes one or more electrode assemblies 2, a housing 10 having one or more cavities 12 for receiving one or more electrode assemblies 2, and a cover 14. A bussing or bussings 16 are integrally molded with battery assembly 1, and more specifically with housing 10 or cover 14. As shown in a non-limiting embodiment of FIG. 1, bussing or bussings 16 are integrally molded with cover 14. However, as discussed in more detail below, a bussing or bussings may also be molded into housing 10. Since the bussing or bussings 16 are integrally molded with the battery assembly 1, cover 14 and housing 10 are sealing attached without interference from the bussing or bussings 16. Each cavity 12 is individually sealed such that each electrode assembly 2 is provided in its respective individual seal-tight cavity 12. Thus, cavity 12 housing electrode assembly 2 may be individually sealed by cover 14 such that there is no need for an individual metallic casing of a battery cell. In other words, the functionality of the metallic casings of battery cells in conventional battery assemblies is combined and integrated with the monoblock battery assembly 1 of the present invention.

Figure 2A:
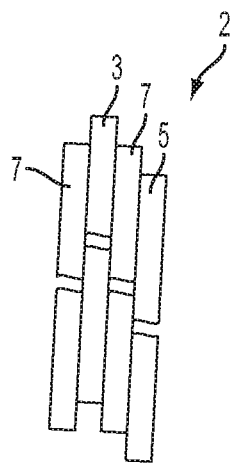
FIG. 2A shows a partial cross-sectional view of an electrode assembly according to an exemplary embodiment.

Monoblock battery assembly 1 has one or more electrode assemblies 2, and may include either a single assembly or multiple assemblies electrically connected in a series or parallel configuration. The structure and shape of electrode assembly 2 is not limiting and may for example, comprise a stacked or prismatic electrode assembly or a wound electrode assembly, commonly known as a jelly roll. As shown in FIG. 2A, each electrode assembly comprises one or more positive electrodes or cathode layers 3, one or more negative electrodes or anode layers 5, and one or more porous separator sheets 7 that are provided between positive and negative electrode layers to electrically isolate electrodes from each other.

Figure 2B:
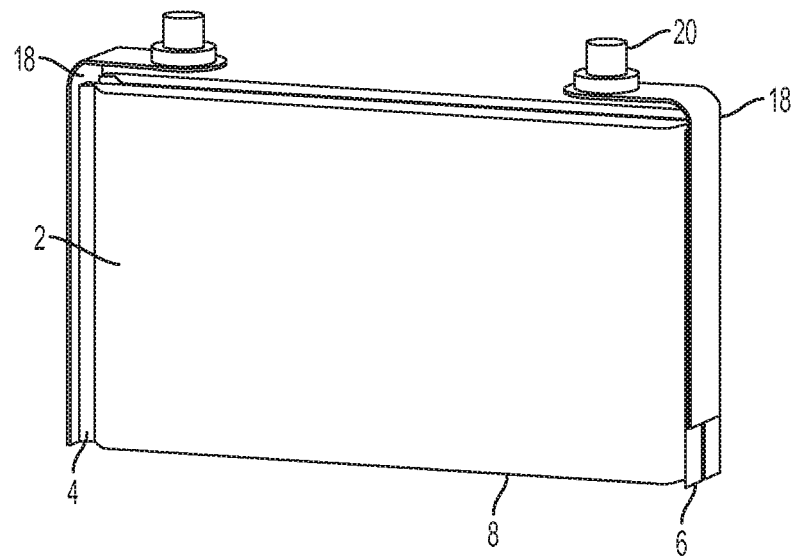
FIG. 2B shows a perspective view of an example of an electrode assembly according to an exemplary embodiment.

As shown in a non-limiting embodiment in FIG. 2B, electrode assembly 2 may be a stacked electrode assembly which has a stack of electrode layers/sheets or substrate foils including at least one positive electrode 3, one or more separator sheets 7, and at least one negative electrode 5. As shown in FIG. 2A, the separator sheets or insulative sheets 7 are provided between positive and negative electrode layers to electrically isolate electrodes from each other. Insulative sheets 7 may be made out of porous material, and/or may be made out of an insulative material, such as but not limited to, a thin-filmed polymer.

Each positive electrode layer 3 and negative electrode layer 5 is substantially coated with an electrochemically active material leaving exposed edges of substrate foil of the positive and negative electrode layer. These exposed edges on the ends of the stack of the positive and negative electrodes form positive electrode group 4 and negative electrode group 6 as shown in FIG. 2B.

As shown in FIG. 2B, each electrode assembly 2 includes an outermost insulative layer 8 which wraps around the stack or layers of positive electrodes layers 3, negative electrodes layers 5, and separator sheets or insulative sheets 7 to substantially encase the stack of positive electrode layers 3, negative electrode layers 5, and insulative sheets 7. In a non-limiting embodiment, outermost layer 8 may be made out of a thin-filmed polymer or the same material as the separator sheets or insulative sheets 7.

While electrode assembly 2 is shown as being provided as having a generally square shape, according to other exemplary embodiments, electrode assembly may have a different configuration (e.g. an oval, rectangular, or cylindrical cross-sectional shape).

As shown in FIG. 2B, a bus strap or bus straps 18 are attached to each positive electrode group 4 and negative electrode group 6. Each bus strap 18 has a terminal 20 attached at one end. Prior to assembly, each bus strap 18 forms a relatively straight shape, and a portion of bus strap 18 opposite the end of terminal 20 is attached to positive electrode group 4 or negative electrode group 6 via welding or another similar means. For example, bus strap 18 may be ultrasonically welded to electrode assembly 2; however spot welding, laser welding or a mechanical coupling with a rivet or a bolt for example is also contemplated. After a portion of bus strap 18 is welded to positive electrode group 4 and negative electrode group 6, a remaining portion of bus strap 18 with terminal 20 is bent from a relatively straight shape into an L-shape. In this manner bus strap 18 extends along a side surface 22 of the electrode assembly and a top surface 24 of the electrode assembly. In a non-limiting embodiment, bus strap 18 is bent 90 degrees. In this manner, terminal 20 is positioned approximately parallel to an upper surface of electrode assembly 2 such that terminal 20 points upwards and away from electrode assembly 2 as shown in FIGS. 1 and 2. FIG. 1 and FIG. 2B shows electrode assembly 2 with two terminals 20 corresponding to a positive terminal and a negative terminal.

Housing 10 of monoblock battery assembly 1 is shown in FIG. 1. Housing 10 is injection molded and has one or more cavities 12 for receiving one or more electrode assemblies 2. Each cavity 12 has a bottom wall, front and rear walls, two side walls or cavity divider walls 13, and an opening for receiving electrode assembly 2. As shown in FIG. 1, electrode assembly 2 is placed in cavity 12 with positive electrode group 4 and negative electrode group 6 front and rear walls of cavity 12 and terminal 20 projecting from opening of cavity 12.

As shown in a non-limiting embodiment of FIG. 1, housing 10 is divided into four cavities 12 by cavity divider walls 13. The number, shape, or size of cavities 12 in the housing 10 is not limiting. In a non-limiting embodiment, one or more cavities 12 are shaped and sized to fit one or more electrode assemblies 2, and the number of cavities 12 corresponds to the number of electrode assemblies 2. It is also contemplated that the number of cavities 12 and the number of electrode assemblies 2 differ from each other, or that more than one electrode assembly 2 may be disposed in a single cavity 12.

In addition to each cavity 12 holding an electrode assembly 2 each cavity 12 also holds electrolyte (not shown). Any electrolyte commonly used in lithium ion batteries may be used, for example but not limited to, ethylene carbonate, dimethyl carbonate, and diethyl carbonate, an electrolyte with lithium salts in an organic solvent, or another similar solution. Further, electrolyte may be any electrolyte comprising an organic solvent selected from the group consisting of cyclic carbonates, linear carbonates, alkyl esters, ethers, lactones, nitriles and mixtures thereof. Cavities 12 are separated from each other by cavity divider walls 13 and are individually sealed such that electrolyte does not pass in between cavities 12.

Housing 10 is made from a polymer material. In a non-limiting embodiment, the polymer material has a low electrolyte and moisture permeation rate. That is, the material of housing 10 is resistant to the electrolyte use, such that electrolyte does not pass in between cavities 12 and does not escape monoblock battery assembly 1. In addition, the material of housing 10 has a low moisture permeability such that once monoblock battery assembly 1 is sealed moisture is not permitted to enter into or leave monoblock battery assembly 1. In addition, housing 10 may be made of a low-cost material of high mechanical strength which is weldable and injection moldable. Examples of materials of the housing include: polypropylene or polyphenylene sulfide.

Monoblock battery assembly 1 also has cover 14 as shown in FIG. 1. In a non-limiting embodiment shown in FIG. 1, cover 14 has one or more bussings 16 integrally molded therein. As noted above, monoblock battery assembly 1 may house one or more electrode assemblies in parallel or in series electrical configuration. One or more bussings 16 are integrally molded into cover 14 so as to connect electrode assemblies in different cavities. For example, as shown in FIG. 1, bussing or bussings 16 electrically connect electrode assemblies in adjacent cavities.

In a non-limiting embodiment, cover 14 is injection molded with the same material as housing 10; however, it is also contemplated that housing 10 and cover 14 are made of different materials. Similar to housing 10, cover 14 may be made of a polymer or other material which has a low electrolyte and moisture permeation rate.

Figure 3:
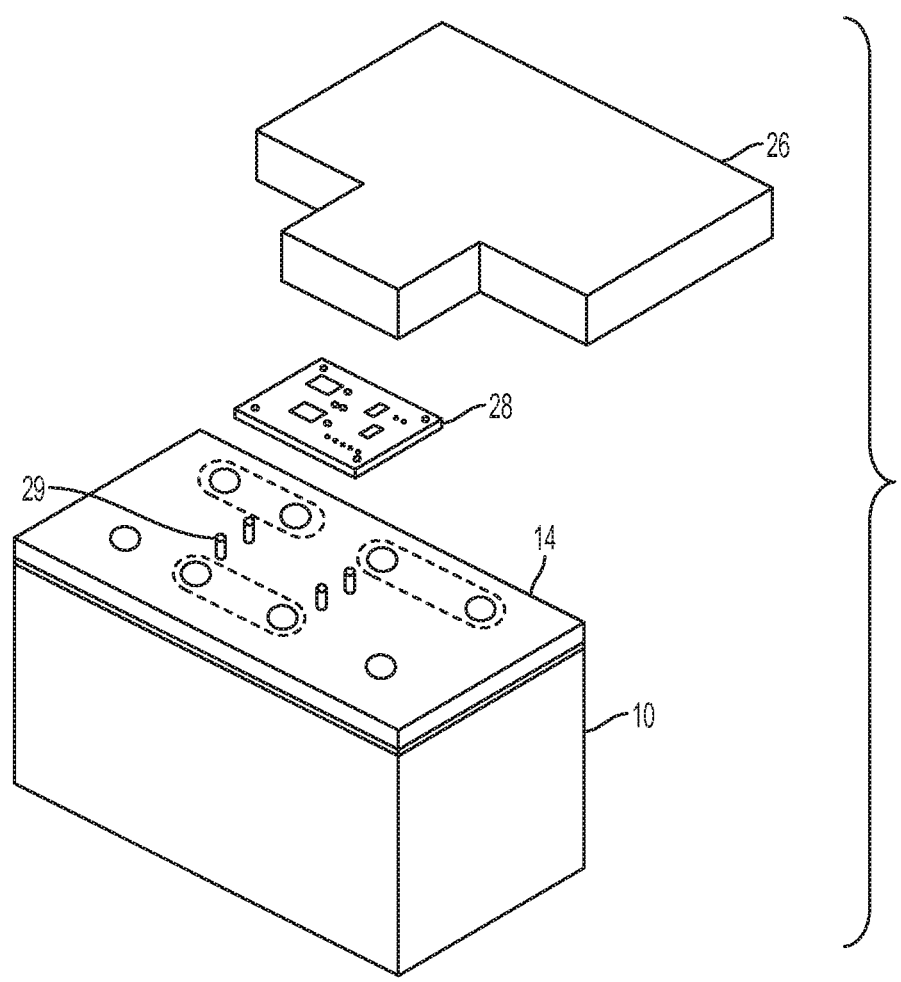
FIG. 3 shows an semi-exploded perspective view of a monoblock battery assembly according to an exemplary embodiment.

The assembly of monoblock battery assembly 1 will now be described in additional detail below. As shown in FIG. 1, electrode assembly 2 is located in a cavity 12 in housing 10 with terminal 20 extending out of an opening of cavity 12. As shown in FIG. 1, positive electrode group 4 and negative electrode group 6 of electrode assembly 2 faces front and rear walls of cavity 12, the front and rear walls being connected by cavity divider walls 13 or side walls. Cover 14 which is over-molded around or injection molded with bussing or bussings 16 and is positioned over electrode assembly 2 and housing 10. Terminals 20 protrude through holes in bussing or bussings 16 and are electrically connected to bussing or bussings 16. In a non-limiting embodiment terminals 20 are swaged to a respective bussing 16 to create a leak-tight, sealed electrical connection. Terminals 20 may also be connected to bussing 16 via welding, such as laser welding or another similar means. Cover 14 is sealed with housing 10 via welding or joining by another means as shown in FIG. 3. Cover 14 and housing 10 are joined together to form a sealed container such that each cavity 12 is individually sealed with an electrode assembly or electrode assemblies 2.

According to an exemplary embodiment, an electrolyte (not shown) may be added to each cavity 12 after electrode assembly 2 is introduced into the housing 10, but prior to cover 14 sealing to housing 10. Each cavity 12 is separated, isolated, and leak-proof from each other cavity. That is, electrolyte must be inserted into each cavity 12 respectively as cavities 12 are not in fluid communication with one another. While electrolyte may be inserted into cavity 12 after to insertion of the electrolyte assembly 2, but prior to cover 14 sealing with housing 10, it is also contemplated that electrolyte may be introduced into each cell cavity through an opening (not shown) in housing 10 or cover 14 after cover 14 is sealed to housing 10. In this embodiment, the opening is later sealed after filling of the electrolyte. Alternatively, electrolyte may be added prior to insertion of electrode assemblies 2. After the electrode assembly 2 is sealed in a cavity 12 with electrolyte, monoblock battery assembly 1 may be electrically formed and charged.

Further, as shown in FIG. 3, control board 28 may be attached to cover 14 at mounting portion 29. Control board 28 monitors voltage in electrode assemblies 2 and is capable of balancing voltage between electrode assemblies 2. Control board 28 is also capable of preventing overcharge of the electrode assemblies. In addition, a secondary cover 26 may be provided over cover 14 to cover and protect terminals 20 which protrude outwardly from cover 14, and to create a water-tight seal to prevent leaks from any space between terminal 20 and a hole of bussing 16.

Providing bussing or bussings 16 molded into cover 14, sealing cover 14 to housing 10, and/or providing individual leak tight cavities for one or more electrode assemblies 2 reduces leaks of battery assembly 1. As shown in FIG. 3, cover 14 is attached and sealed to housing 10 forming a sealed and leak-proof battery assembly 1. For example, cover 14 having a bussing or bussings 16 integrally molded therewith and an electrode assembly 2 attached thereto forms a seal-tight casing for each electrode assembly between cavity 12 and cover 14 and prevents a leak path from cavities 12 to the exterior.

Further, cavity 12 along with cover 14 individually seals each electrode assembly 2 and electrolyte in a casing. Since bussing or bussings 16 are integral to cover 14, bussing or bussings 16 connect electrode assemblies 2 in separate cavities while maintaining a seal between the cover 14 and housing 10. Thus, the need for an additional metallic casing of a battery cell is not needed as the monoblock battery assembly 1 provides a separate casing for each electrode assembly 2 and electrolyte as well as a single sealed casing for monoblock battery assembly 1.

Figure 4:
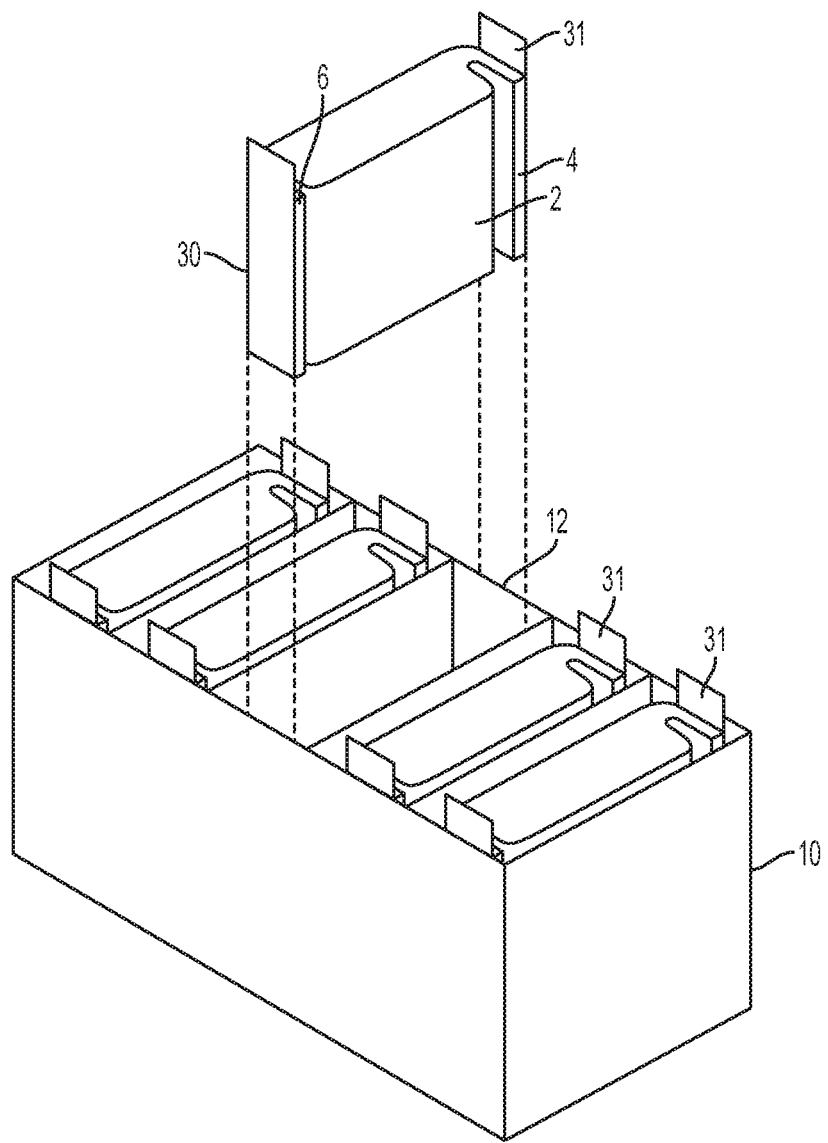
FIG. 4 shows a partial perspective view of a monoblock battery assembly according to an alternate embodiment.
Figure 5:
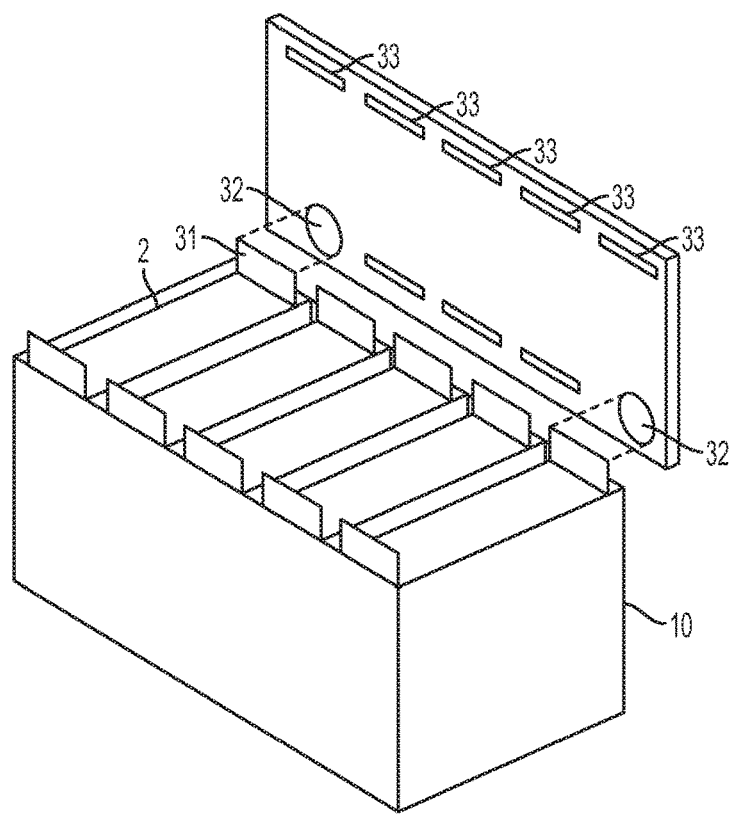
FIG. 5 shows a partial perspective view of a monoblock battery assembly according to the battery assembly shown in FIG. 4.

FIG. 4 shows a portion of monoblock battery assembly 1 according to an alternate embodiment. This embodiment mirrors the first embodiment with a few differences. One difference is that bus strap or bus straps 30, attached to positive electrode group 4 and negative electrode group 6 of electrode assembly 2 respectively, each has an extended portion 31 which extends upwardly beyond an upper surface of electrode assembly 2. In this embodiment, bus strap or bus straps 30 are substantially straight as opposed to being bent as described in the first embodiment above. Another difference is cover 14 has slots 33 along its outer perimeter to receive extended portion 31 of bus strap 30 as shown in FIG. 5. FIGS. 4 and 5 show extended portion 31 of the bus straps and corresponding slots 33 in cover 14 as having a rectangular cross-section; however the shape is non-limiting and extended portion 31 and slots 33 may have an oval, round, or square cross-sections for example. Cover 14 is electrically connected to one or more electrode assemblies at terminal 32 which is provided integral with cover 14 as shown in FIG. 5. That is, in a non-limiting embodiment, terminal 32 is attached via welding or another similar means to one or more extended portion 31 of bus strap 30. For example, as shown in FIG. 5, an extended portion 31 of a first and last electrode assembly 2 of the one or more electrode assemblies 2 are attached to terminals 32. This arrangement is not limiting as any electrode assembly may connect to terminal 32. As shown in FIG. 5, terminal 32 is connected to extended bus strap portion 31, and then extended portion 31, attached to terminal 32 and cover 14, is bent inwards to align substantially parallel with a top surface of electrode assembly 2 such that cover 14 may be placed flat on top of housing 10. Cover 14 is sealed to housing 10, and extended portions 31 of bus straps 30 which are not electrically connected to cover 14 via terminal 32 extend through slots 33 beyond a top surface of cover 14. Seals are placed around bus strap or bus straps 30 to seal gaps between extended portions 31 and cover 14. Thereby preventing liquid electrolyte from escaping cavity 12, and preventing moisture from entering cavity 12.

Figure 6:
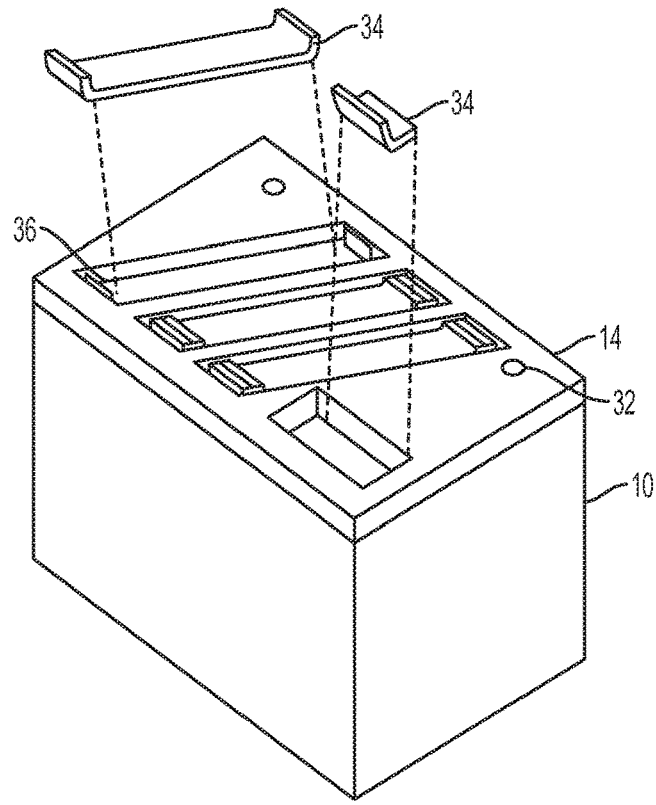
FIG. 6 shows a perspective view of a monoblock battery assembly according to the battery assembly shown in FIG. 4.

As shown in FIG. 6, a top outer surface of cover 14 has one or more openings 36. Openings 36 are positioned on cover 14 to extend between cavities 12 to connect electrode assemblies in either electrical series or parallel configuration. For example, bussing or bussings 34 may be provided in a variety of sizes to connect a positive electrode group 4 of one electrode assembly 2 to a negative electrode group 6 of an adjacent electrode assembly 2 (end-to-end) or to connect a positive electrode group 4 to a positive electrode group 4 or a negative electrode group 6 to a negative electrode group 6 of adjacent electrode assemblies 2 (side-to-side). Bussing or bussings 34 are welded or by other means electrically connected to extended portions 31 of bus straps 30 which protrude from cover 14. As shown in FIG. 6, an opening 36 receives a bussing 34 such that bussing or bussings 34 are integrated with cover 14.

Figure 7:
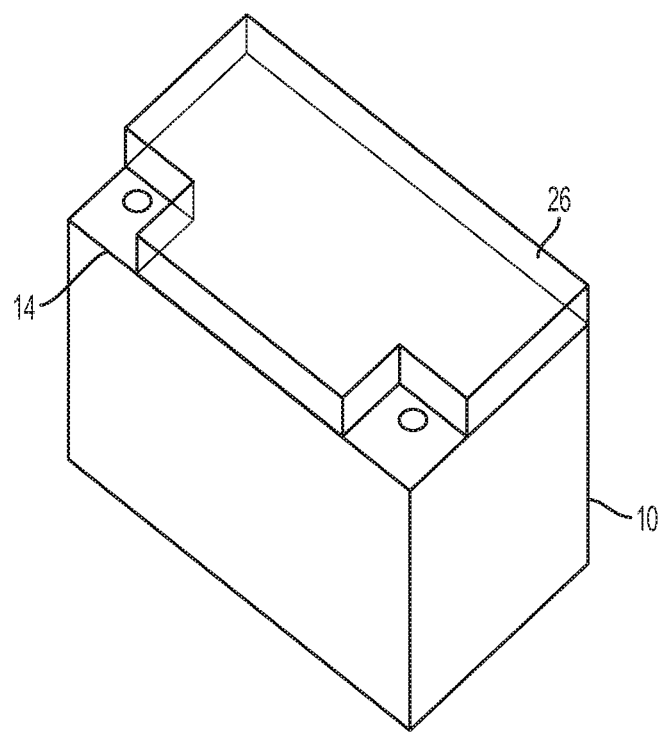
FIG. 7 shows a perspective view of a monoblock battery assembly according to the battery assembly shown in FIG. 4.

As shown in FIG. 7, similar to the embodiment above, a secondary cover 26 may be provided over cover 14 to form a water-tight monoblock battery assembly 1. Secondary cover 26 may be welded to cover 14 to create a sealed environment for battery assembly 1. In all other aspects the above embodiment is similar to the first embodiment.

FIGS. 8-14 show alternate embodiment(s) of a battery assembly of the present invention. These embodiments mirror the first embodiment with a few differences. One difference is that in these embodiments, a bussing is integral with the battery assembly, and specifically with housing 10 of battery assembly.

Figure 8:
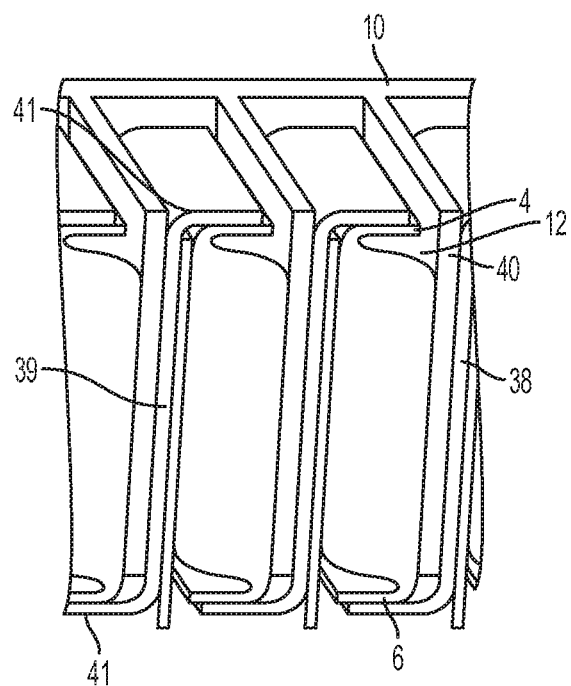
FIG. 8 shows a partial cross section of a housing of a monoblock battery assembly according to an alternate embodiment.

FIG. 8 shows a partial cross section of a housing 10 with a bussing or bussings 38 being provided integral housing 10 according to an embodiment of the present application. As shown in FIG. 8, housing 10 is provided with cavity divider walls 40 and two openings on a top and bottom portion. One or more cavities 12 are formed by cavity divider walls 40 extending vertically and dividing housing 12 into sections. Electrode assembly 2 is located in cavity 12 and is oriented such that positive electrode group 4 and negative electrode group 6 are facing openings at the bottom and top of cavity 12.

Bussing or bussings 38 are provided integral with cavity divider wall(s) 40. As shown in FIG. 8, bussing 38 is substantially S-shaped such that a vertical portion 39 connects two horizontal portions 41 extending in opposite directions. As shown in FIG. 8, a vertical portion 39 of bussing 38 extends substantially parallel to cavity divider wall 40 and is molded into cavity divider wall 40 such that a portion of bussing 38 (i.e. a bare conductive metal portion) extends out of cavity divider wall 40. Horizontal portions 41 interconnect electrode assemblies 2 in adjacent cavities 12 as shown in FIG. 8. For example, as shown in FIG. 8, one horizontal portion 41 extends underneath cavity divider wall 40 and another horizontal portion 41 of the same bussing 38 extends over electrode assembly 2. The arrangement of bussing 38 is not limited to that disclosed in FIG. 8 and any arrangement which interconnects electrode assemblies may be used.

Figure 11:
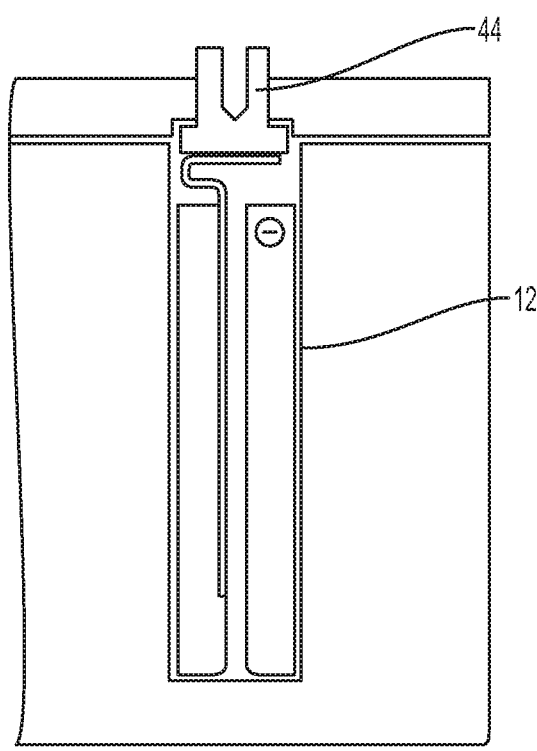
FIG. 11 shows a cross-sectional view of the monoblock battery assembly according to an exemplary embodiment.

A non-limiting embodiment of the assembly of monoblock battery assembly 1 of this embodiment will now be described. Bussing 38 (which is substantially straight prior to assembly) is integrally molded into cavity divider walls 40 of housing 10. Electrode assembly 2 has a positive electrode group 4 and a negative electrode group 6 formed by bare foil edges of the stacked layers of positive electrodes and negative electrodes, respectively. These electrodes or bare foiled edges are welded or otherwise electrically connected to ends of bussing 38. The ends of electrode assembly 2 may be folded over as shown in FIG. 8 prior to or after welding with bussing 38. After electrode assembly 2 is welded to bussing 38, bussing 38 will be an a substantially S-shape having vertical portion 39 and two horizontal portions 41 as discussed above. In this embodiment of the invention, a bottom plate (not shown) is welded or otherwise mechanically connected to housing 10 which seals a bottom of cavities 12. A cover 14 is also welded or otherwise mechanically connected to a top of housing 10 to seal each cell into individual containers. As shown in FIG. 11, the main polarity of a first and last electrode assembly 2 in monoblock battery assembly 1 may be connected to terminal 44 and to pass through a sealed interface in the top cover so that the polarities may be accessed from the outside of battery assembly 1. Electrolyte is introduced into each cell cavity 12. Monoblock battery assembly 1 is then electrically formed and charged in order to finish the monoblock battery assembly. In all other aspects the above embodiment is similar to the first embodiment.

Figure 9:
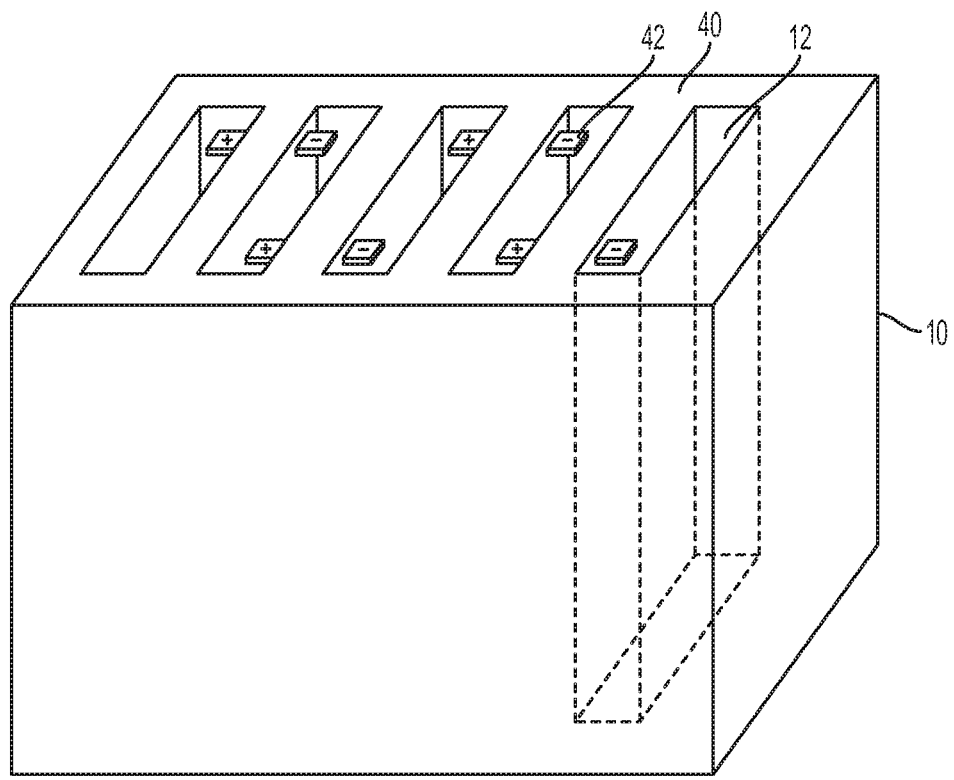
FIG. 9 shows a perspective view of a monoblock battery housing according to an alternate embodiment.
Figure 10:
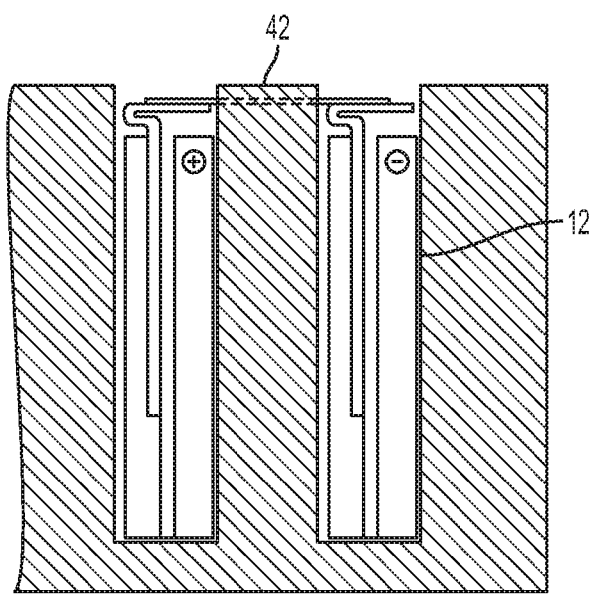
FIG. 10 shows a cross-sectional view of the monoblock battery assembly according to the embodiment shown in FIG. 9.

FIG. 9 shows an alternate embodiment similar to the embodiments described above; however, in this embodiment bussing or bussings 42 are provided integral with cavity walls divider 40 of housing 10. As shown in FIG. 10 bussing or bussings 42 are integrally molded underneath a surface of cavity divider wall 40 such that exposed portions of bussing or bussings 42 extend into adjacent cavities 12. Bussing or bussings 42 connect electrode assemblies in adjacent cavities in series or in parallel electrical configuration. Electrode assemblies would be oriented in housing 10 such that positive electrode group 4 and negative electrode group 6 electrically connect to positive and negative portions of bussing or bussings 42 respectively. For example, in the embodiment shown in FIG. 9, the positive electrode group 4 and negative electrode group 6 of electrode assemblies would be facing front and rear walls of housing 10 in an alternating pattern. Similar to the configuration above, in FIG. 11 the main polarity of a first and last electrode assembly 2 in monoblock battery assembly 1 may be vertically orientated and connected to terminal 44 to pass through a sealed interface in the top cover so that the polarities (i.e. a negative polarity and a positive polarity) may be accessed from the outside of battery assembly 1. In all other aspects the above embodiment is similar to the first embodiment.

Figure 12:
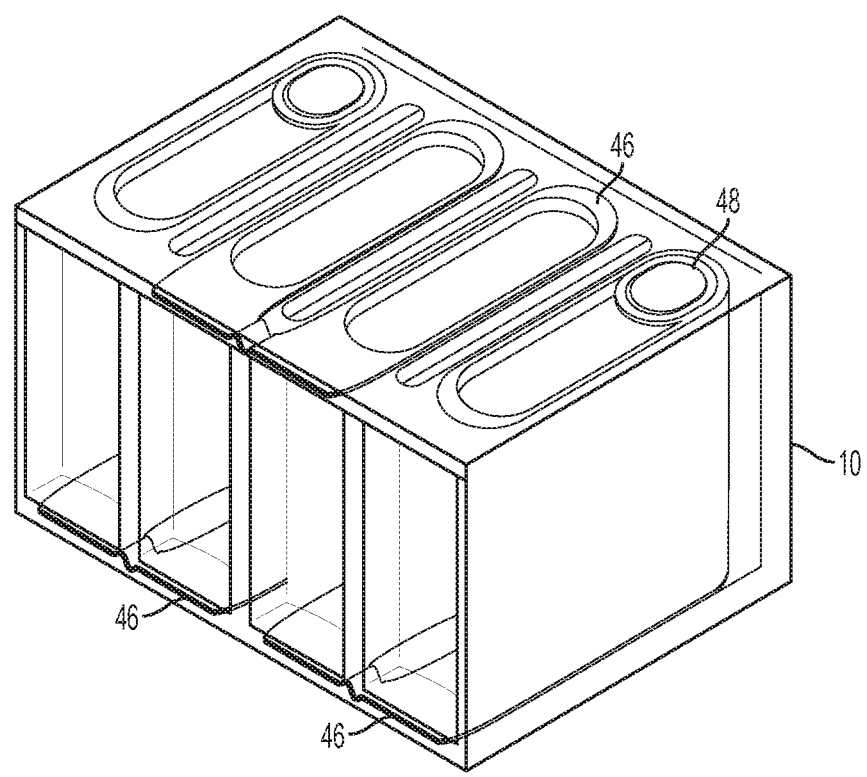
FIG. 12 shows a perspective view of a monoblock battery assembly according to an alternate embodiment.
Figure 13:
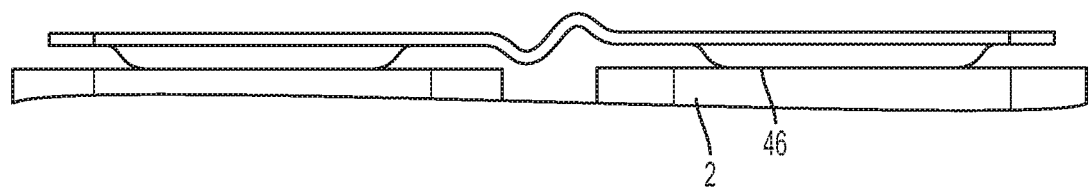
FIG. 13 shows a partial cross-sectional view of the monoblock battery assembly according to the embodiment shown in FIG. 12.

FIGS. 12 and 13 show a battery assembly according to an alternate embodiment. This embodiment is similar to the embodiment as described above with a few differences. One difference is that housing 10 has a top wall, bottom wall, and one side wall. That is, cover 14 will be placed on a side of housing 10 as opposed to on top of housing 10, for example. Electrode assemblies are placed in cavities 12 with positive and negative electrode groups facing towards a top and bottom of housing 10 as shown in FIG. 8, for example. As shown in FIG. 12, monoblock battery assembly 1 according to this non-limiting embodiment includes bussing 46 which is integrally molded to a top wall and a bottom wall of housing 10 to connect electrode assemblies in parallel or series electrical configuration. As shown in FIG. 12, bussing 46 may be provided in between two adjacent cavities 12 to interconnect electrode assemblies 2 in adjacent cavities. FIG. 13 shows a cross-sectional view of bussing 46 in contact with two adjacent electrode assemblies. Electrode assemblies 2 are blind laser welded from an outside of monoblock battery assembly 1 to bussing 46 thereby connecting electrode assemblies 2 together. In order to achieve a blind laser weld, a spacer or stiff plastic plate may be placed within electrode assemblies 2 to push electrodes into contact with bussing 46. A cover (not shown) is welded to a side of the housing to seal each cell into individual containers. The main polarity of a first and last electrode assembly 2 in monoblock battery assembly 1 may be connected to terminal or terminals 48 and passed through a sealed interface in the top cover so that the polarities may be accessed from the outside of battery assembly 1. In all other aspects the above embodiment is similar to the first embodiment.

Figure 14:
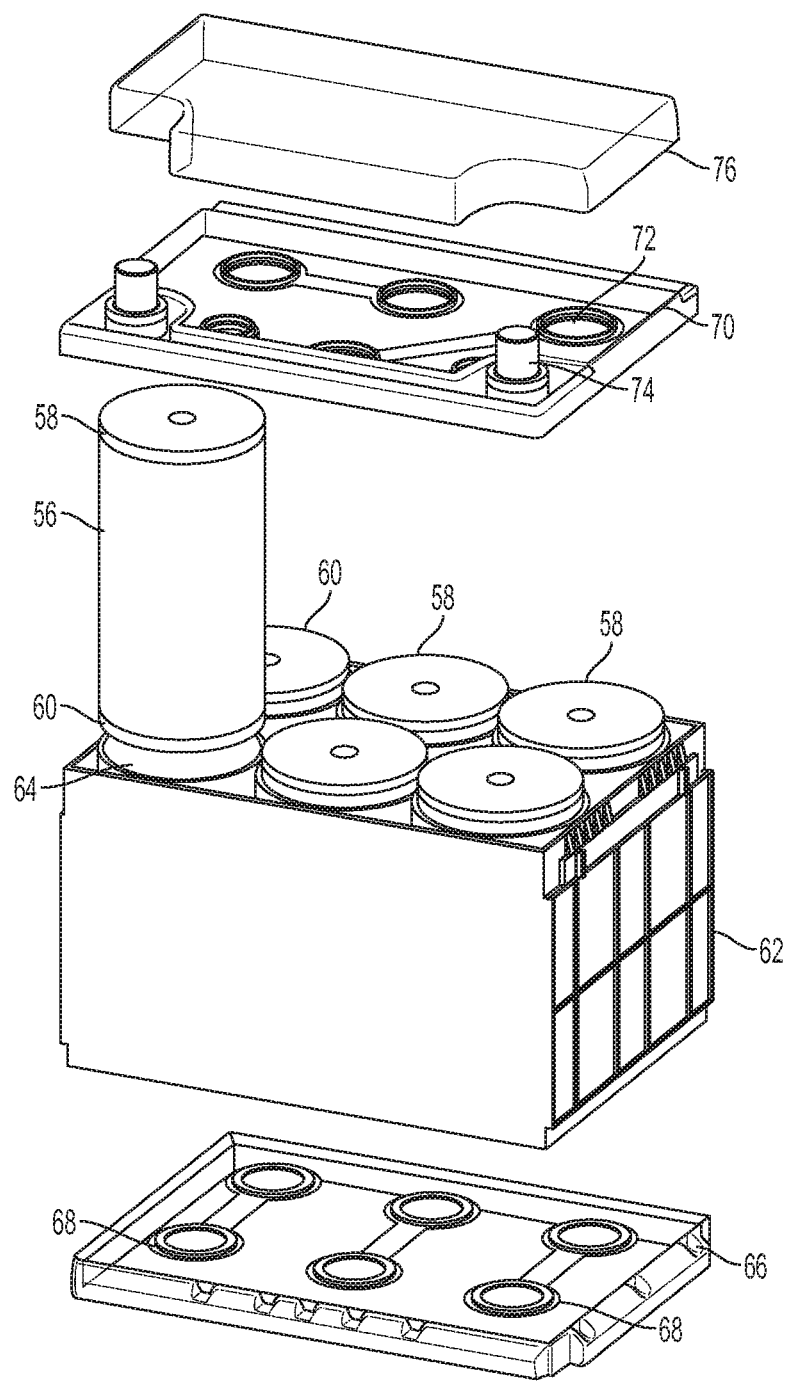
FIG. 14 shows an exploded perspective view of a battery assembly according to an exemplary embodiment.

As discussed above, in addition to a stacked electrode assembly shown in FIG. 2, a wound electrode assembly or jelly-roll may also be used as shown in FIG. 14. The embodiment shown in FIG. 14 is similar to the embodiments discussed above, except for a few differences pointed out below. In all other aspects this embodiment is the same as those discussed above. A wound electrode assembly 56 includes one or more positive electrode sheets, one or more negative electrode sheets, and one or more separators which are stacked together in an alternating pattern and wrapped around a winding core. The one or more separators are provided intermediate or between the positive and negative electrodes to electrically isolate the electrodes from each other. Similar to electrode assembly 2 described above, wound electrode assembly 56 has a positive electrode group 58 and negative electrode group 60 on opposite ends of wound electrode assembly 56.

The one or more wound electrode assemblies 56 are inserted into a monoblock battery assembly, and more specifically into a housing 62 which is made of injection molded polymer and has one or more cylindrical cavities 64. As shown in the non-limiting embodiment in FIG. 14, the housing 62 has six cavities. However, the number of cavities is not limiting. As shown in FIG. 14, wound electrode assemblies 56 are inserted into housing 62 in an alternating pattern such that the exposed positive electrode foils or positive electrode group 58 of one wound electrode assembly 56 is adjacent to a negative electrode foils or negative electrode group 60 of an adjacent wound electrode assembly 56.

In the non-limiting embodiment as shown in FIG. 14, a lower cover 66 which is made of injection modeled polymer includes over-molded bussing or bus sings 68. Lower cover 66 is welded to the bottom of the housing 62. Over-molded bussing or bussings 68 in lower cover 66 are welded or by some other means electrically connected to the exposed electrode foils or positive electrode groups 58 and negative electrode groups 60 of the wound electrode assemblies 56. An intermediate upper cover 70 which is made of injection modeled polymer and includes over-molded bussing or bussings 72 is welded to the top of housing 62. Bussing or bussings 72 are similarly welded or by some other means electrically connected to the opposite positive electrode groups 58 and negative electrode groups 60 of the wound electrode assemblies 56. The intermediate upper cover 70 also contains at least one battery terminal 74 which is electrically connected to the over-molded bussings or bussings 72 for connecting to the main polarity of a first and last electrode assembly in the monoblock battery assembly and allowing the polarities to be accessed outside the battery assembly. Similar to the embodiments discussed above, the wound electrode assemblies 56 may be electrically connected in series or parallel configuration. Thus, the battery assembly may have multiple arrangements of wound electrodes and bussing or bussings to electrically connect the electrode assemblies in a desired configuration.

In a non-limiting embodiment, electrolyte is introduced into each cavity 64 after insertion of wound electrode assemblies 56, but prior to cover 76 sealing to housing 62. In an alternate embodiment, electrolyte is introduced into each cavity 64 through an opening (not shown) in housing 62, lower cover 68, or upper cover 70 after cover 76 is sealed to housing 62. The opening is closed after filling is complete.

As shown in FIG. 14, a space is provided above the over-molded bussing or bussings 72 in the intermediate upper cover 70 for housing electronics of the monoblock battery assembly. An outer cover 76 is welded to the top of intermediate upper cover 70 to seal in the electronics and bussing or bussings 72.

While embodiments of this application refer to Lithium Ion battery assemblies, the invention is not limited to Lithium Ion batteries and could be used in other battery assemblies that would be obvious to one or ordinary skill in the art. Further, while embodiments of this application discuss the cover(s) being placed in a specific orientation with respect to the housing, the orientation of the battery assembly is not limiting, and the battery assembly could take any orientation (such as having a removable cover(s) on one of or multiple sides of the housing) as obvious to one of ordinary skill in the art.

Although a few example embodiments have been shown and described, these example embodiments are provided to convey the subject matter described herein to people who are familiar with this field. It should be understood that the subject matter described herein may be embodied in various forms without being limited to the described example embodiments. The subject matter described herein can be practiced without those specifically defined or described matters or with other or different elements or matters not described. It will be appreciated by those familiar with this field that changes may be made in these example embodiments without departing from the subject matter described herein as defined in the appended claims and their equivalents. Further, any description of structural arrangement of components or relationship there between is merely for explanation purposes and should be used to limit an example embodiment.

Aspects related to the example embodiment have been set forth in part in the description above, and in part should be apparent from the description, or may be learned by practice of embodiments of the application. Aspects of the example embodiment may be realized and attained using the elements and combinations of various elements and aspects particularly pointed out in the foregoing detailed description and the appended claims. It is to be understood that both the foregoing descriptions are an example and are explanatory only and are not intended to be limiting.

What is claimed is:

1. A lithium-ion monoblock battery assembly comprising:
   a) a housing having a plurality of cavities,
   b) an electrode assembly received in each cavity; and
   c) a cover, wherein said housing has a top wall, a bottom wall and one side wall,
said cover is welded on a side wall of housing,
each electrode assembly has positive and negative electrode groups facing towards the top wall and the bottom wall of the housing,
a bussing is integrally molded to the top wall and the bottom wall,
the electrode assemblies are blind laser welded from an outside of the monoblock battery to bussing thereby connecting electrode assemblies together.

2. The lithium-ion monoblock battery assembly according to claim 1, wherein the cavities are separate individually hermetically sealed cavities but electrically connected cavities.

3. The lithium-ion monoblock battery assembly according to claim 1, wherein the electrode assembly in each cavity is in direct contact with the housing.

4. The lithium-ion monoblock battery assembly according to claim 1, wherein the housing is made from a polymer material.

5. The lithium-ion monoblock battery assembly according to claim 1, wherein the cover is made from a polymer material.

6. The lithium-ion monoblock battery assembly according to claim 1, wherein a polarity of a first electrode assembly and a polarity of a last electrode assembly are connected to a terminal and passed through a sealed interface in the top wall.

7. A lithium-ion monoblock battery assembly comprising:
   a) a housing having a plurality of cavities,
   b) an electrode assembly received in each cavity; and
   c) a cover, wherein said housing has a top wall, a bottom wall and one side wall,
said cover is welded on a side wall of housing,
each electrode assembly has positive and negative electrode groups facing towards the top wall and the bottom wall of the housing,
a bussing is integrally molded to the top wall and the bottom wall,
the bussing interconnects two electrode assemblies in adjacent cavities,
the bottom wall and the top wall comprise at least one opening for accessing to at least a portion of the bussing.

8. The lithium-ion monoblock battery assembly according to claim 7, wherein the cavities are separate individually hermetically sealed cavities but electrically connected cavities.

9. The lithium-ion monoblock battery assembly according to claim 7, wherein the electrode assembly in each cavity is in direct contact with the housing.

10. The lithium-ion monoblock battery assembly according to claim 7, wherein the housing is made from a polymer material.

11. The lithium-ion monoblock battery assembly according to claim 7, wherein the cover is made from a polymer material.

12. The lithium-ion monoblock battery assembly according to claim 7, wherein a polarity of a first electrode assembly and a polarity of a last electrode assembly are connected to a terminal and passed through a sealed interface in the top wall.

13. A method for assembling a lithium-ion monoblock battery assembly comprising:
   a) a housing having a plurality of cavities,
   b) an electrode assembly received in each cavity; and
   c) a cover, wherein said housing has a top wall, a bottom wall and one side wall,
said cover is welded on a side wall of housing,
each electrode assembly has positive and negative electrode groups facing towards the top wall and the bottom wall of the housing,
a bussing is integrally molded to the top wall and the bottom wall,
the bussing interconnects two electrode assemblies in adjacent cavities, the bottom wall and the top wall comprise at least one opening for accessing to at least a portion of the bussing,
said method comprising the step of blind laser welding the electrode assembly from an outside of the monoblock battery to bussing thereby connecting electrode assemblies together.

14. The method according to claim 13, wherein a spacer or a stiff plastic plate is placed within electrode assemblies to push electrodes into contact with bussing before performing the step of blind laser welding.

* * * * *